United States Patent [19]
Kirchhoff

[11] Patent Number: 5,841,122
[45] Date of Patent: Nov. 24, 1998

[54] SECURITY STRUCTURE WITH ELECTRONIC SMART CARD ACCESS THERETO WITH TRANSMISSION OF POWER AND DATA BETWEEN THE SMART CARD AND THE SMART CARD READER PERFORMED CAPACITIVELY OR INDUCTIVELY

[75] Inventor: Gerhard Kirchhoff, Iserlohn, Germany

[73] Assignee: Dorma GmbH + Co. KG, Ennepetal, Germany

[21] Appl. No.: 644,537

[22] Filed: May 10, 1996

Related U.S. Application Data

[63] Continuation-in-part of PCT/DE95/01127, Aug. 25, 1995.

[30] Foreign Application Priority Data

Sep. 13, 1994 [DE] Germany .......................... 44 32 324.7

[51] Int. Cl.[6] .................................................... G06K 19/06
[52] U.S. Cl. ............................ 235/492; 235/493; 235/487
[58] Field of Search ................................... 235/380, 382, 235/487, 492, 493

[56] References Cited

U.S. PATENT DOCUMENTS

| | | |
|---|---|---|
| 3,689,810 | 9/1972 | Walles ...................................... 317/258 |
| 4,612,668 | 9/1986 | Sarac . |
| 4,825,056 | 4/1989 | Ohta et al. .......................... 235/493 X |
| 4,941,201 | 7/1990 | Davis . |
| 4,985,922 | 1/1991 | Kolbert . |
| 5,272,326 | 12/1993 | Fujita et al. ............................. 235/487 |
| 5,321,240 | 6/1994 | Takahira .................................. 235/380 |
| 5,436,441 | 7/1995 | Inoue ...................................... 235/487 |
| 5,481,102 | 1/1996 | Hazelrigg, Jr. .......................... 235/487 |

FOREIGN PATENT DOCUMENTS

| | | |
|---|---|---|
| 0006691 | 1/1980 | European Pat. Off. . |
| 0441237 | 8/1991 | European Pat. Off. . |
| 3840180 | 4/1990 | Germany . |
| 4017934 | 1/1992 | Germany . |
| 8910651 | 11/1989 | WIPO . |

*Primary Examiner*—Donald T. Hajec
*Assistant Examiner*—Karl Frech
*Attorney, Agent, or Firm*—Nils H. Ljungman and Associates

[57] ABSTRACT

A device and a method for manufacturing the device for the wireless retrieval of information, in which the energy and data are transmitted between the response station and the inquiry station capacitively or inductively. The capacitances and inductances are closely bonded to one another, and the capacitance is manufactured from a high-resistance conductive substance

19 Claims, 9 Drawing Sheets

SECURITY STRUCTURE WITH ELECTRONIC SMART CARD ACCESS THERETO WITH TRANSMISSION OF POWER AND DATA BETWEEN THE SMART CARD AND THE SMART CARD READER PERFORMED CAPACITIVELY OR INDUCTIVELY

CONTINUING APPLICATION DATA

This application is a Continuation-In-Part application of International Application No. PCT/DE95/01127, filed on Aug. 25, 1995, which claims priority from Federal Republic of Germany Patent Application No. 44 32 324.7, filed on Sept. 13, 1994. International Application No. PCT/DE95/01127 was pending on the above cited application. The U.S. was an elected state in International Application No. PCT/DE95/01127.

BACKGROUND OF THE INVENTION

1. Field of the Invention

The present invention relates to a device for a wireless data inquiry system. In such a system, a response station is supplied with the necessary energy and with the corresponding information by means of a wireless inquiry signal from an inquiry station. For example, the system in question can be supplied with the necessary energy wirelessly by means of a reading device, and can also transmit the information wirelessly to an inquiry station, whereby the reading device can be moved over a specified distance during the inquiry process. The present invention also relates to a method for the manufacture of such a device.

The present invention additionally relates to a security system which utilizes a smart card for accessing the security system, e.g., a security door wherein a smart card or so-called key card is used to gain access therethrough.

2. Background Information

It has long been known that energy and data can be transmitted inductively via coils, which corresponds essentially to a transformer with a corresponding air gap. It is also known that energy and data can be transmitted by high frequency, i.e., in telecommunications. These two methods are technically very complex, in particular when the inquiry station is in motion during the inquiry process.

German Patent No. 40 17 934 discloses a device for the wireless inquiry of data, which is designed so that a secure transmission of data and energy is guaranteed while retaining a simple construction of the device. The inquiry station is provided with a generator which produces an alternating current signal which is transmitted to the response station via capacitors.

European Patent Application 0 441 237 discloses a portable, field-programmable panel. In this detector panel, an inductance is used both for the transmission of energy and for the transmission of data. This device can also be programmed in the field. On this device, the data is transmitted by pulse pause modulation and is evaluated digitally.

WO 89/10651 discloses an electrical transmission device in which the transmission device can be operated by means of a contactless coupling, or communications, module with a termination network of a generator. In addition to the energy, the corresponding data is also transmitted by modulating a base frequency. For this purpose, resonant circuits are used which consist essentially of flat printed traces, or circuits. In this case, the capacitances are used primarily for compensation.

An additional system which also operates according to the transponder principle is disclosed in European Patent No. 0 006 691 A.

OBJECT OF THE INVENTION

One object of the present invention is the provision of a device for the transmission of energy and also for reading and writing data, which device can be manufactured very easily and economically, to the point where it can be economically mass produced.

Another object of the present invention is the provision of a security system which includes a smart card reader device and at least one smart card having electronic circuitry, the smart card reader device controlling a security device (e.g., a security door) access through which is obtained by inserting the smart card into the smart card reader device, and wherein energy for the circuitry of the smart card is transmitted wirelessly thereto from the smart card reader device and data is transmitted wirelessly between the smart card reader device and the smart card.

SUMMARY OF THE INVENTION

The invention teaches that these and other objects can be accomplished by the use of an inductance (or inductor) which is provided with a backing. For example, this inductance can be wound, etched or even vapor-deposited onto the corresponding backing material. But it is also possible, instead of the backing, to use a self-supporting inductance in the form of a coil which is so stable in terms of its shape that it does not deform even under mechanical loads. A high-resistance but conductive substance is then applied to this inductance, This substance represents the capacitor areas, and is therefore manufactured from two geometrically independent structures which lie one inside the other but are not connected to one another. For the conductive substance, it is highly desirable that its electrical resistance be very high, because such a characteristic prevents any effects of magnetic fields on the inductance. At the same time, however, this substance must also be sufficiently low-resistance that a correct capacitive transmission of data is guaranteed. The capacitor areas thereby lie immediately above, or adjacent to, the inductance, which makes it clear that the conductive substance may not be low-resistance, since otherwise it would inherently represent a short circuit and also a short circuit for the emission field of the inductance. As a result of this close coupling of the inductance and the capacitance in an extremely small space, the present invention makes it possible to manufacture a response station, for example, which operates according to the transponder principle, can communicate with the stationary station, and can also be manufactured economically, namely by realizing a thin response station, for example, one designed in the size and format of a credit card, e.g., a so-called "smart card".

One disadvantage of similar known systems is that, with capacitive systems, the interaction with the inductances is not insensitive to position, as is the case with purely inductive systems. For this reason, the systems of the prior art are generally constructed so that there is an inductance in the middle of the system, and the capacitances are located to the left and right of the inductance. As a result of this placement, however, the units are not insensitive to position, and they must be used in a defined position, so that they can communicate properly with the stationary station.

But if the capacitor surfaces are placed in front of the inductance, the arrangement forms a short circuit for the inductance if the capacitance is manufactured from a low-resistance material. As a result of this short circuit, the inductance collapses which in turn contains a very high current, which is a function of the corresponding number of turns per unit length. The magnetic fields which build up are therefore neutralized, and no operation is possible with such a device.

As a result of the use of the high-resistance conductive substance claimed by the invention, the capacitor surfaces can be placed one inside the other. The conductive substance, for example, can be a carbon varnish (or resist, e.g., a substance applied to a surface to reduce its conductivity, for example, during electro-plating), which has a very high resistance, and therefore does not represent a short circuit path for the inductance. The term carbon varnish in this case is used in the sense of conducting or semi-conducting varnish, which is preferably manufactured as two component screen printing lack (e.g., resembling lac, lacquer or shellac). This carbon conducting varnish has, in one embodiment, preferably been enriched with a special carbon black and/or a special type of graphite so that it has a sufficiently high electric conductivity. In addition to conductivity, such a varnish can also have a very high mechanical strength. Such a varnish can also be used for solder strips, so that there are no problems involved in achieving good contact, and/or bonding. Likewise, after the hot air levelling, there are essentially no changes of the resistance value. To achieve an increase in the resistance of such a carbon conducting varnish, it can be enriched with a two-component insulation part, for example. Such a process has essentially no effect on the inductance. It is therefore possible to have a capacitive feed to the system. The use of a device of the type described above makes possible a capacitive data transmission in any position with the simultaneous advantage of the high reading distance. For example, it is possible to use such a device in full-duplex operation, i.e., data can be polled and transmitted simultaneously with the transmission of energy.

In the device according to the invention, the inductance and capacitance are preferably located almost in a single plane, or are placed directly next to one another. "In a single planes", as that term is used herein, means that, when they are realized as a thin element without a corresponding backing, they are one directly opposite, or abutting, or on top of, the other.

Suitable conductive substances include, for example, a carbon varnish or any other conductive substance, because it is very high-resistance for the existing inductance and, as a capacitive surface, it is sufficiently conductive. The deposition of such a resist is preferably carried out by placing masks, or stencils, at the points of the device where a capacitor surface is to be produced. The varnish can be deposited by spraying, painting or printing (e.g., by screen printing). The thickness of the layer deposited thereby simultaneously determines the resistance value. All other high-resistance materials which can be deposited in the above-mentioned manner can also be used. Alternatively, however, it is also possible to use corresponding conductive plastics or films which have a correspondingly high resistance value, and can simultaneously be used as a capacitive material.

The size of the capacitive surfaces is determined on the basis of the specific application, but the geometric shape of these surfaces is completely independent, and can therefore be adapted easily to the requirements of the market. For example, the capacitance surfaces can be designed in the shape of a ring or in a circular shape, so that they can be placed one inside the other.

The capacitance surfaces need not be closed and continuous; the surfaces can also be open at one point, although in that case a larger active surface is necessary for the capacitance.

The above discussed embodiments of the present invention will be described further hereinbelow with reference to the accompanying figures. When the word "invention" is used in this specifications the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments which are illustrated in the accompanying drawings, wherein.

DESCRIPTION OF THE PREFERRED EMBODIMENT

Figure 1:
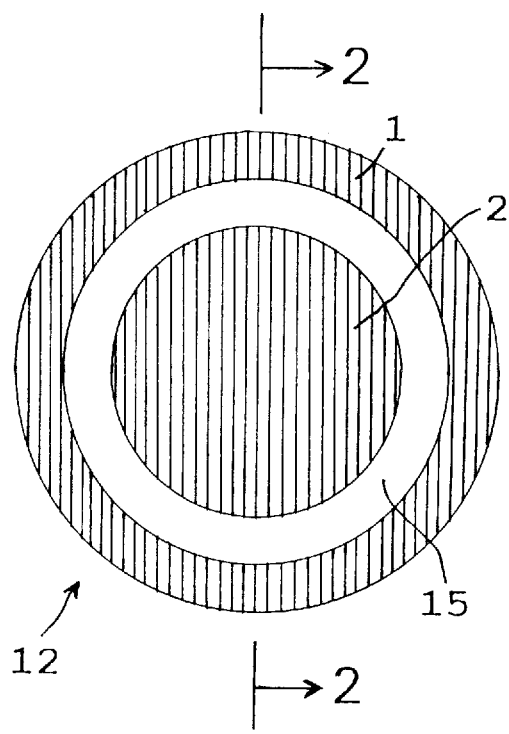
FIG. 1 shows a circular, ring-shaped capacitor surface.

FIG. 1 shows a circular capacitor surface 2, around which a second capacitor surface 1 is placed in a ring, or annular, shape. Between the two capacitor surfaces 1 and 2 there is a space which acts as a dielectric 15 between the plates. The capacitance 12 which originates in this manner, as described above, is preferably formed from a high-resistance, conducting substance which is applied as part of the corresponding manufacturing method. FIG. 1 does not show the contacts, or bondings, for connection to other electrical components (e.g., a circuit 9 shown in FIG. 5, for example, an integrated circuit).

Figure 2:
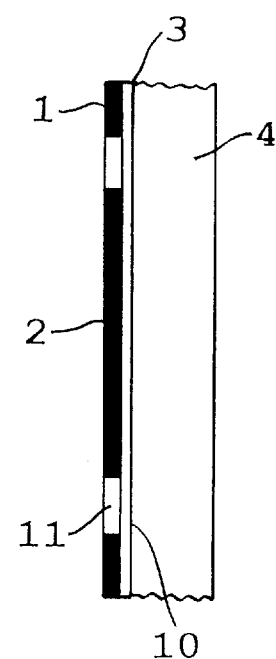
FIG. 2 shows a section 2—2 through this capacitor surface as illustrated in FIG. 1, with the inductance behind it.

In the cross section 2—2 of this embodiment shown in FIG. 2, it can be seen that the capacitor surfaces 1 and 2 are provided on a backing 3, on one side 11 of the backing 3. This backing 3 can, for example, be a film or any other suitable electrically non-conductive material. The inductance (or inductor) 4 is positioned on the opposite side 10 of the backing 3. This inductance 4, as described above, can be applied by etching, vapor deposition, or it can be positively connected in the form of windings to the backing 3. The illustration shows that there is a very tight, or close, bonding, in particular between the capacitor 12 with its capacitor surfaces 1 and 2, and the inductance 4. This tight bonding, however, is only possible because the capacitor surfaces 1 and 2 consist of a high-resistance conductive substance. If that were not the case, there would be a short circuit of the magnetic field of the inductance 4.

Figure 3:
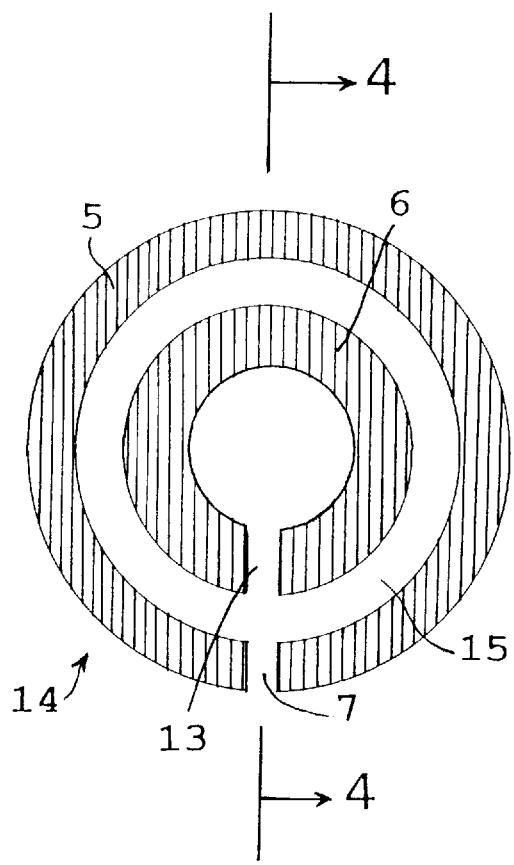
FIG. 3 shows two non-continuous capacitor surfaces.

FIG. 3 shows a variant of a capacitor. A capacitance 14 is formed from capacitor surfaces 5 and 6, which in this case do not themselves form a short circuit. Rather, there is an interruption 7 at a desired point in the ring-shaped capacitor surface 5. Moreover, the inner capacitor surface 6 separated by the dielectric 15 is also realized in the form of a ring, and also has an interruption 13 at a desired point. If the capacitance 14 in realized in the manner described above, however, larger surface areas are necessary to achieve a corresponding equivalent capacitance, as described in FIG. 1.

Figure 4:
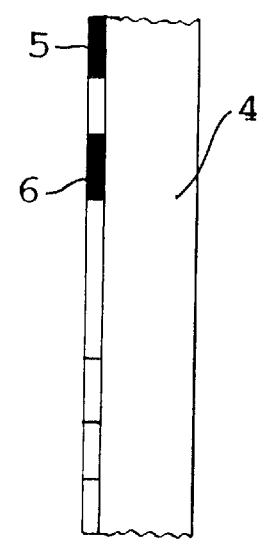
FIG. 4 shows a section 4—4 through the capacitor surfaces as illustrated in FIG. 3 with inductance.

FIG. 4 shows a cross section 4—4 of the embodiment illustrated in FIG. 3, in which the capacitance 14 has been applied directly on the inductance 4. This arrangement is possible if the inductance 4 is in itself a highly stable body, which makes it possible to apply the high-resistance conductive substance directly thereto.

Figure 5:
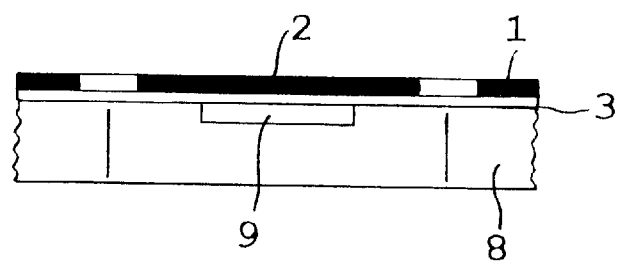
FIG. 5 shows a section through the system of capacitor surface with inductance with a backing.

As shown in FIG. 5, a circuit 9 (e.g., an integrated circuit) for the processing of information or the storage of information can be used with a correspondingly appropriate placement inside the inductance 8. Here again, the capacitor surfaces 1 and 2 are in close proximity to the inductance 8 on a backing 3. As a result of the placement of the circuit 9 inside the inductance 8, the bonding of the capacitor surfaces 1 and 2 with the circuit 9 can be made directly through the backing 3.

As indicated in the preceding description, a response station for the wireless transmission of information and energy can be established between an extremely small and very economical inquiry station.

Figure 6:
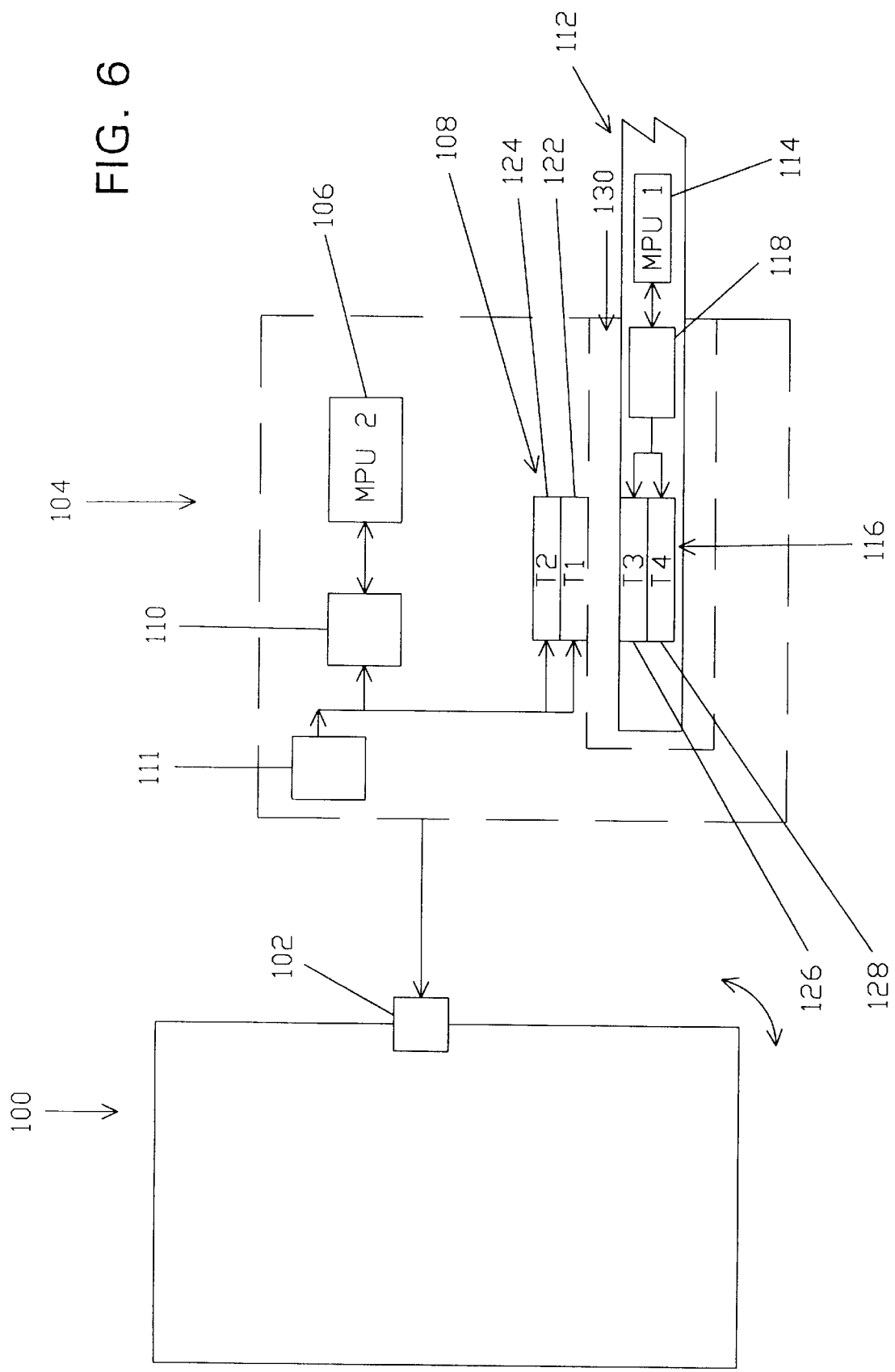
FIG. 6 is a schematic illustration of a security system (e.g., a security door) which is controlled by a smart card reader device and access to which is obtained through a so-called smart card.

FIG. 6 is a schematic illustration of a security system (e.g., a security door wherein access is gained via a smart card) according to the present invention. A security door 100 is latched and unlatched by an electronic locking device 102 which is controlled by a smart card reader device 104, which generally includes a microprocessor unit (e.g., "MPU2") 106, a smart card reader antenna 108, and a digital encoding and interface unit 110 which interfaces the microprocessor (MPU2) 106 with the smart card reader antenna 108 and enables the flow of data therebetween. The smart card reader device 104 additionally includes a power supply unit 111 for supplying power to the smart card reader antenna 108.

The smart card reader device 104 is enabled to unlock the security door 100 by at least one smart card 112, which preferably includes an additional microprocessor unit ("MPU1") 114, a smart card antenna 116 and another digital encoding and interface unit 118, which transmits data and power between the microprocessor unit (MPU1) 114 and the smart card antenna 116. The smart card reader antenna 108 includes a first transducer device (T1) 122 and a second transducer device (T2) 124, while the smart card antenna 16 includes a third transducer device (T3) 126 and a fourth transducer device (T4) 128. The first transducer device (T1) 122 of the smart card reader device 104 is coupled with the third transducer device (T3) 126 of the smart card 112 preferably for the transmission of data between the smart card 112 and the smart card reader device 104, while the second transducer device (T2) 124 of the smart card reader device is coupled with the fourth transducer device (T4) 128 preferably for the transmission of power from the power supply unit 111 of the smart card reader device 104 to the microprocessor unit (MPU1) 114 of the smart card 112.

At least one and preferably both, of the smart card reader antenna 108 and the smart card antenna 116 are preferably constructed as described above with respect to FIGS. 1–5. That is, one of the two transducer devices in each of the smart card reader antenna 108 and the smart card antenna 116 is a capacitive element (e.g., one of the capacitive elements 12 and 14 in FIGS. 1–5), and the other of the two transducer devices is a magnetic inductive element (e.g. one of the inductive elements 4 and 8 in FIGS. 1–5). Moreover, the capacitive elements in the smart card reader antenna 108 and the smart card antenna 116 are preferably configured as described with respect to FIGS. 1–5 above, that is, as concentric annular or semi-annular surfaces, and are preferably constructed from the high-resistance, electrically conductive materials set forth above.

Most preferably, in the security system of FIG. 6, the second transducer device (T2) 108 of the smart card reader device 104 and the fourth transducer device (T4) 128 of the smart card 112 are both magnetic inductive elements 4 as described in connection with FIGS. 1–5 which are magnetically inductively coupled, this magnetic inductive coupling being used for the wireless transmission of power from the smart card reader device 104 to the smart card 112 while the smart card 112 is positioned within a slot 130 provided in the smart card reader device such that the smart card reader antenna 108 and the smart card antenna 116 are aligned and in close proximity to one another. Moreover, the first transducer device (T1) 122 and the third transducer device (T3) 126 are preferably both capacitive elements 12 or 14 as described in connection with FIGS. 1–5 which are capacitively coupled, this capacitive coupling being used for the wireless transmission of data between the smart card reader device 104 and the smart card 112.

In any case, the impedances of the transducer devices (T1–T4) 122, 124, 126 and 128 are properly chosen such that any one of the transducer devices (T1–T4) 122, 124, 126 and 128 will not load the magnetic field or electromagnetic field of another of the transducer devices (T1–T4) 122, 124, 126 and 128. In the particular case referred to above, wherein the second transducer device (T2) 108 of the smart card reader device 104 and the fourth transducer device (T4) 128 of the smart card 112 are magnetically inductively coupled for the wireless transmission of power, and wherein the first transducer device (T1) 122 of the smart card reader device 104 and the third transducer device (T3) 126 of the smart card 112 are capacitively coupled for the wireless transmission of energy, the capacitive elements of the first transducer device (T1) 122 and the third transducer device (T3) 126 are configured to have a substantially higher impedence than the magnetic energy produced by the second transducer device (T2) 124 so as to substantially reduce any loading of the magnetic energy.

We now turn to FIGS. 7–14, which illustrate a structure for housing a smart card reader device, such as is described above, in the wall of a building, for example, adjacent a security door entrance to the building.

Figure 7:
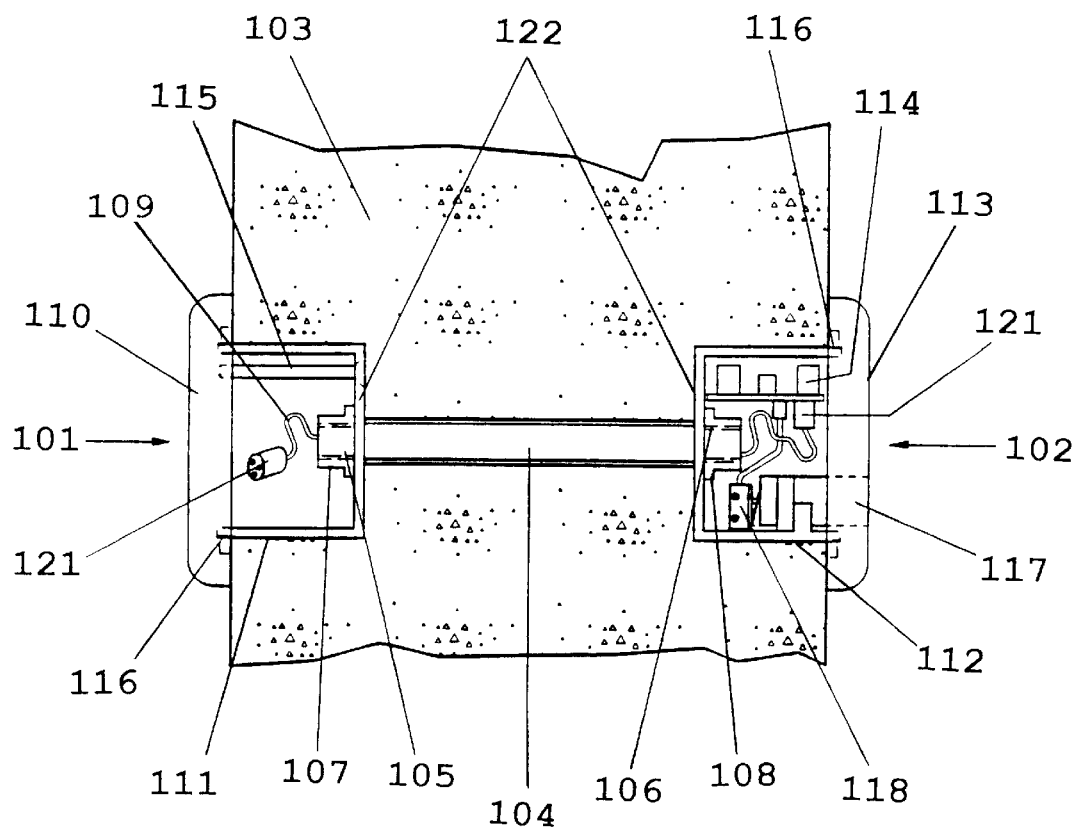
FIG. 7 shows an outside flush-mounted box connected to an inside flush-mounted box, as installed.
Figure 8:
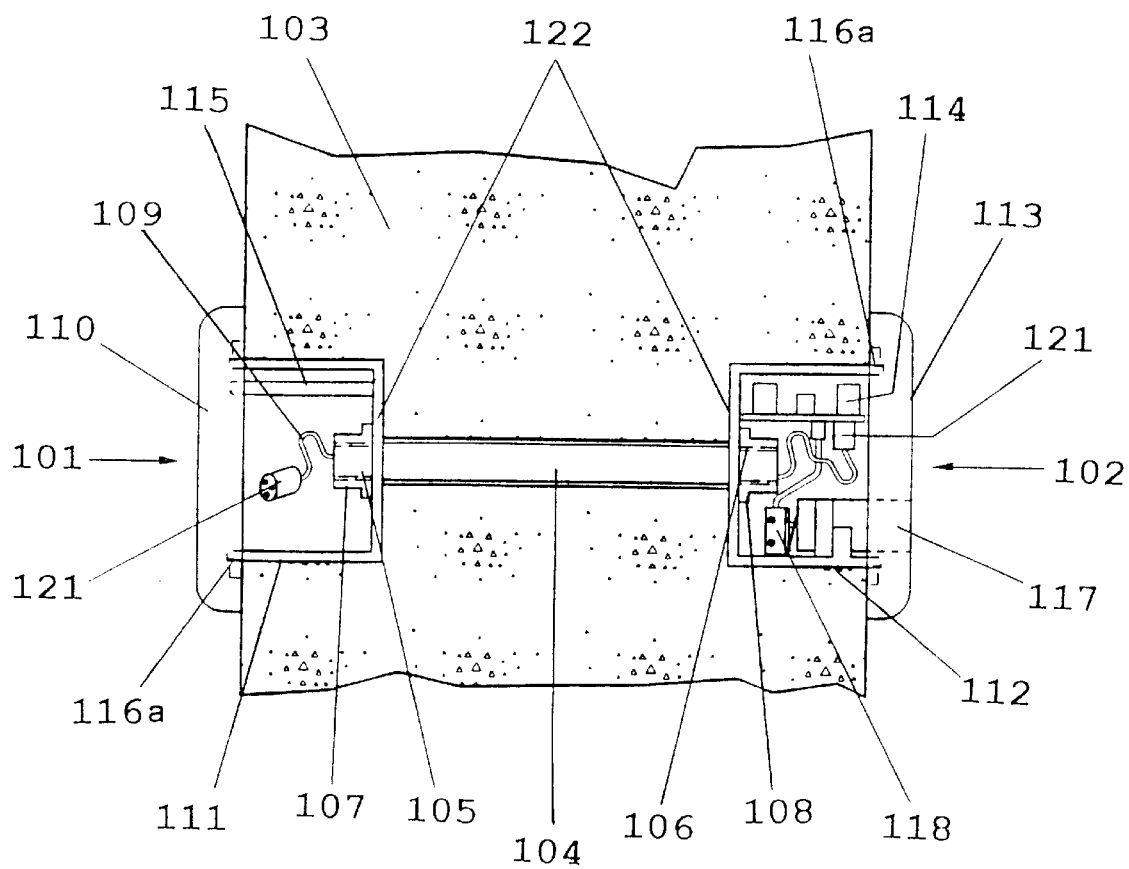
FIG. 8 shows the same view as shown in FIG. 7 only with additional components.
Figure 9:
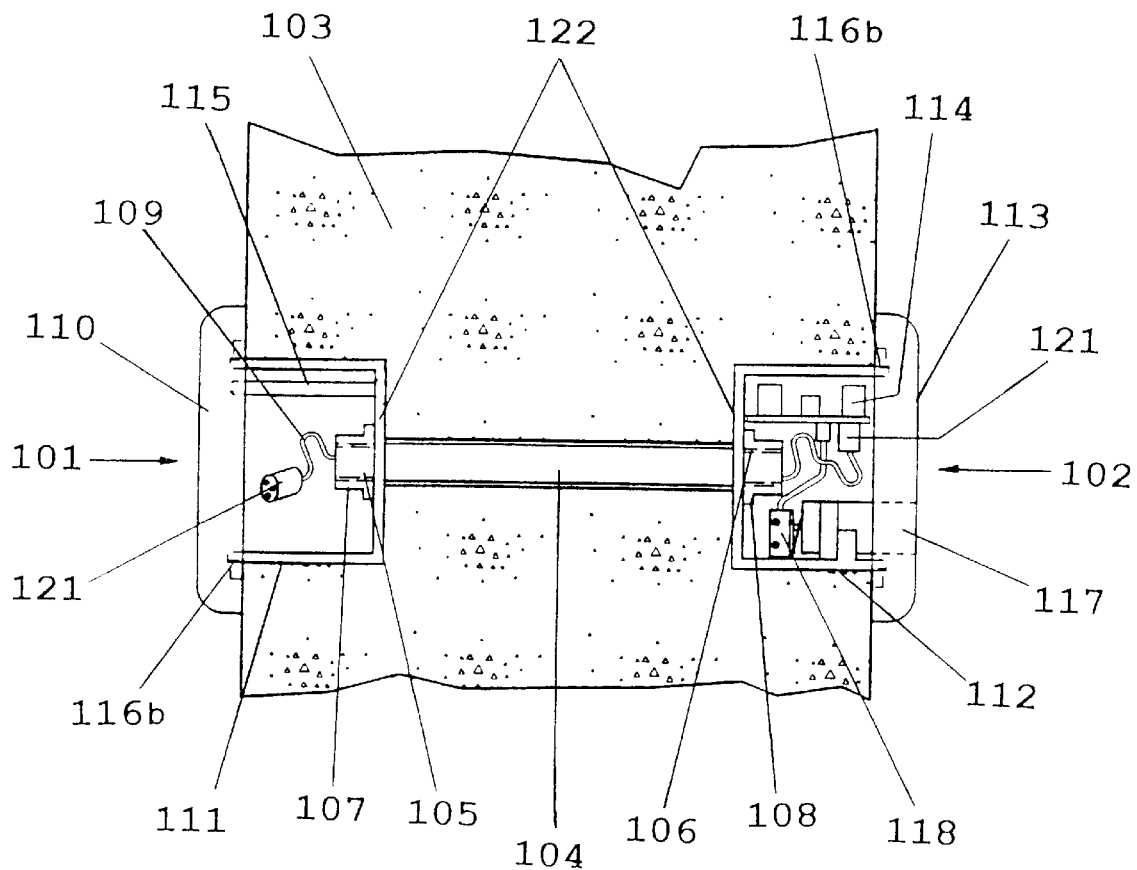
FIG. 9 shows the same view as shown in FIG. 7 only with additional components.

FIG. 7 shows a reader station 101 and a control station 102 in the wall 103 of a building. The reader station 101 and the control station 102 can be connected to one another by means of a connecting tube 104. A flush-mounted sensor of the reader station 101 can be formed by a cover 110 and a flush-mounted box 111. The flush-mounted box 111 can be built into the wall 103, and the flush-mounted box 111 can protrude out of the wall 103 by means of an outside edge. The outside edge of the flush-mounted box 111 can include a thread 116, as shown in FIG. 7. The thread 116 can also be present in the cover 110, whereby the cover 110 can be positively and non-positively connected to the flush-mounted box 111 by screwing on the cover 110. In addition to the connection described above by means of the thread 116, essentially any other type of connection can also be possible. In particular, a latch or clip connection 116a which is shown schematically in FIG. 8, or a bayonet connection 116b which is shown schematically in FIG. 9, can alternatively be used to connect the cover 110 and the flush-mounted box 111. The outside edge of the flush-mounted box 111 can thereby lie outside or inside the wall 103.

One end of the connecting tube 104 can be positively and non-positively attached to the bottom 122 of the flush-mounted box 111 by means of a thread 105 and a threaded connection 107. The other end of the connecting tube 104 can be attached to the bottom 122 of the flush-mounted box 112 by means of a thread 106 and a bolted connection 108. The flush-mounted box 112 can also be installed in the wall 103. The flush-mounted box 112, together with a cover 113, can represent the three-dimensional structure of the control station 102.

As a result of the type of installation described above, the reader station 101 and the control station 102 can be positively and non-positively connected to one another. Such a connection can be particularly important with regard to protection against sabotage and vandalism.

In accordance with one embodiment of the invention, the flush-mounted box 112 of the control station 102 can preferably be mounted in a flush manner against the wall 103 to permit low visibility of the flush-mounted box 112 to thereby essentially provide additional protection from vandalism.

Figure 11:
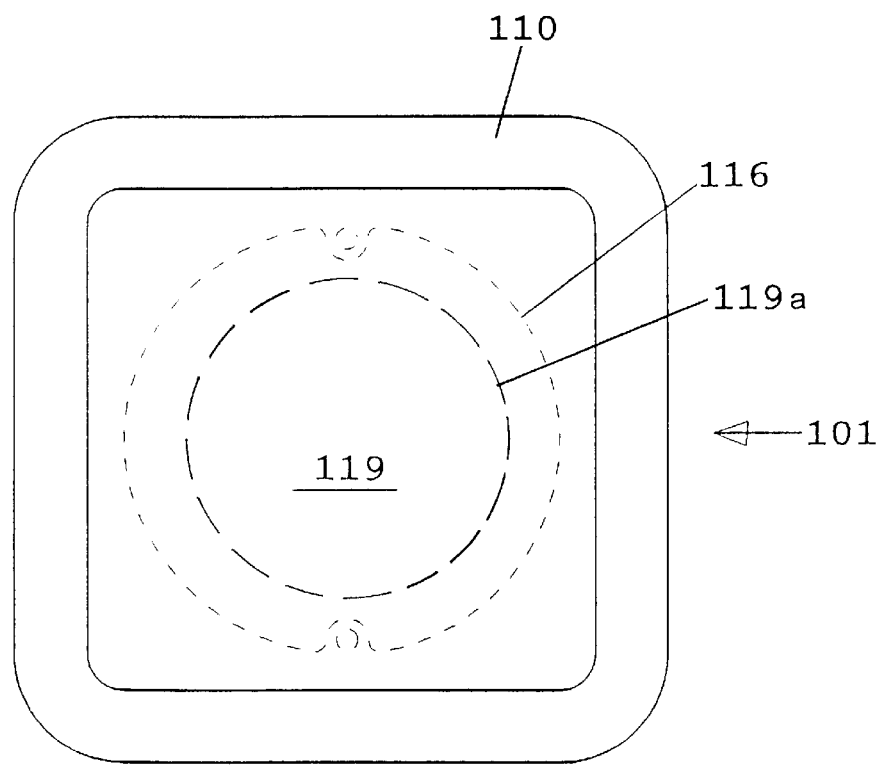
FIG. 11 shows the same view as shown in FIG. 10 only with additional components.

In accordance with one embodiment of the present invention, an antenna 119a can be located within the window 119, as shown in FIG. 11. By locating the antenna 119a within the window 119 of the cover 110, the system can thereby include a contactless personal identification system.

Figure 10:
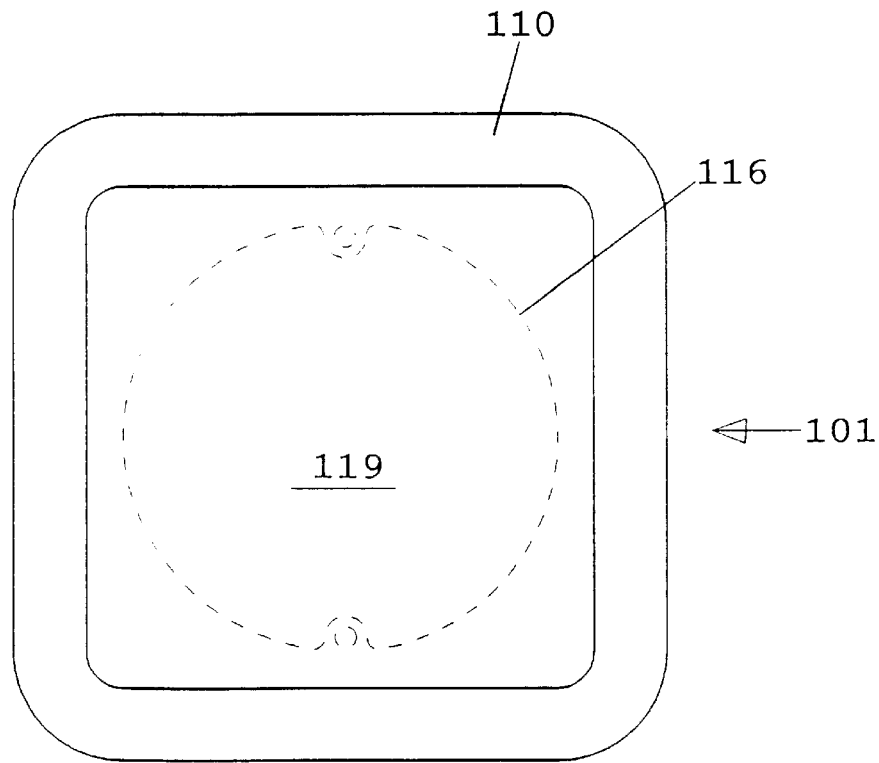
FIG. 10 shows a cover of an external reader station.

The flush-mounted box 112 of the control station 102, like the flush-mounted box 111, can have a thread 116 in the peripheral area of the flush-mounted box 112. The thread 116 can protrude out of the wall 103 or the thread 116 can be located inside the wall 103. Like the reader station 101, the cover 113 can be positively and non-positively connected to the flush-mounted box 112. The communication between the reader station 101 and the control station 102 can take place via a connecting cable 109, which connecting cable 109 can run through the connecting tube 104. Inside the control station 102, there can be a printed circuit controller board 114, for example, which can evaluate the signal from the reader station 101. In a contactless personal identification system, for example, the signals at the reader station 101 can be captured by means of the antenna 119a, which antenna 119a can be located in the window 119, as shown in FIGS. 10 and 11. These systems, which can operate on the basis of the transponder system, may be particularly suitable for use by physically handicapped persons. Such a transponder system can also be suitable if the system is designed so that it does not require the correct positioning or insertion of the cards for identification, e.g. in OP-areas or operations areas.

In accordance with one embodiment of the invention, the reader station 101 and the control station 102 can be operatively connected by means of the connecting cable 109, which connecting cable 109 can extend through the connecting tube 104. Since the connecting tube 104 and the connecting cable 109 can be essentially enclosed within the wall 103, the connection of the connecting cable 109 between the reader station 101 and the control station 102 can essentially be protected from vandalism and adverse effects of climatic conditions.

The invention teaches that inside the window 119, the antenna 119a can be either metallized onto or otherwise attached to the side of the cover 110 facing the side of the mounted box 111. The signals from the antenna 119a can be transmitted via a plug-and-jack connection 121 and by the connecting cable 109 to the controller board 114.

Figure 12:
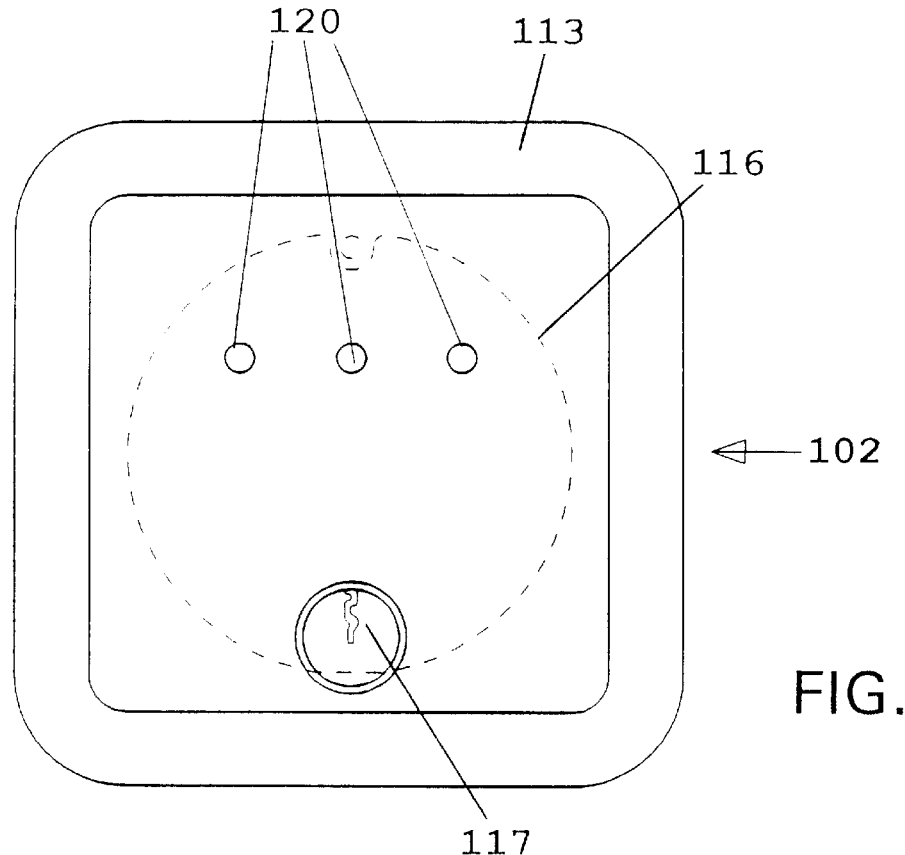
FIG. 12 shows the cover of a control station for the indoor station.
Figure 13:
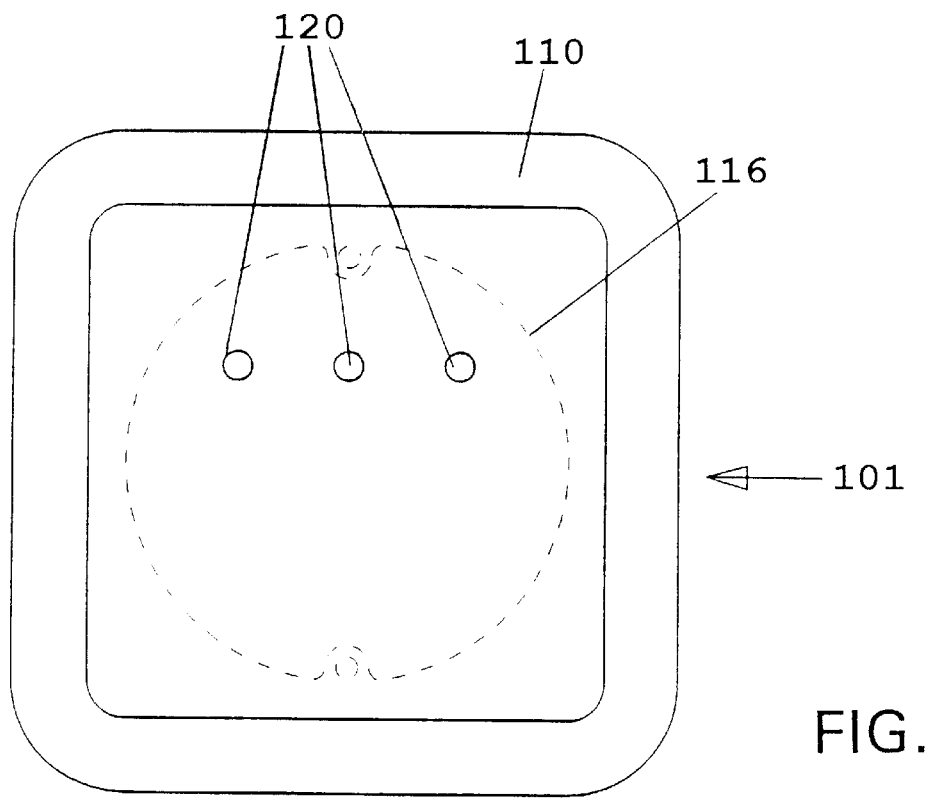
FIG. 13 shows the cover of a reader station with display elements.

In addition to locating an integrated antenna 119a in the vicinity of the window 119, it can also be possible to locate operating indicators 120 in the vicinity of the window 119, as shown in FIG. 13. The operating indicators 120 can indicate the status of the system in the cover 110. These operating indicators 120 can also be located in the vicinity of the control station 102, as illustrated in FIG. 12. In addition to the operating indicators 120, FIG. 12 also shows a key switch 117, which key switch 117 can be used, for example, to activate the reader station 101 and thus to also activate the control station 102. When the key switch 117 is in the position where the key has been extracted, it can also provide protection against unauthorized opening.

The covers 110 and 113 can also be equipped with safety screws or locking screws 115 and switches 118, respectively, for an installation line. When the switch 118 is actuated, an alarm could thereby automatically be actuated, because that would indicate a manipulation of the covers 110 and 113.

Figure 14:
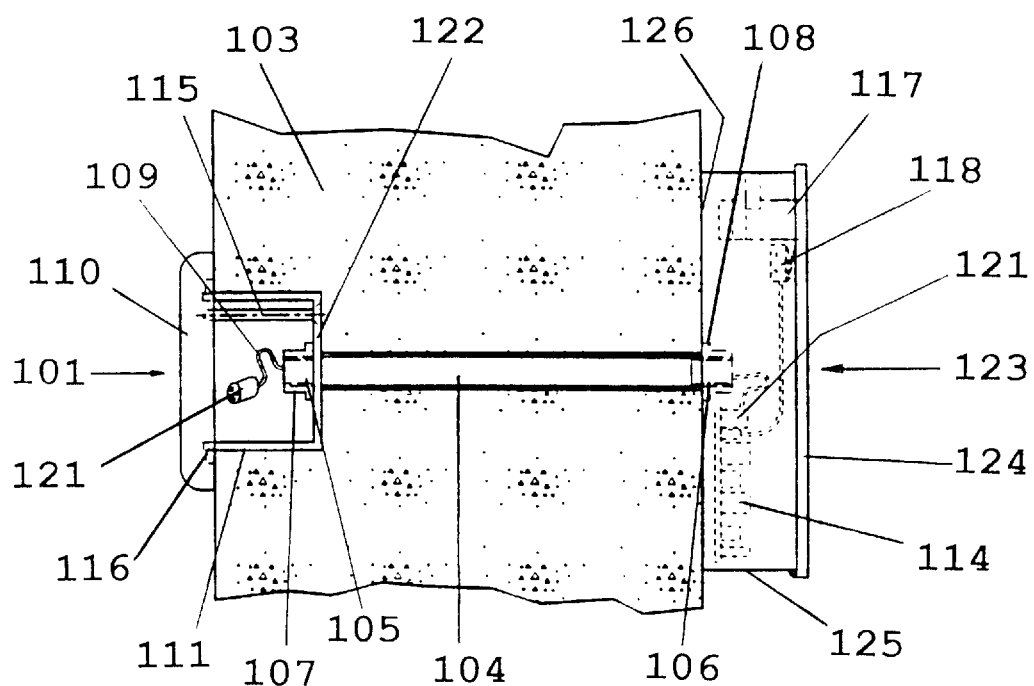
FIG. 14 shows the location of an outside flush-mounted station with an inside surface-mounted station.

In addition to the method described above, it can also be possible to install the flush-mounted box 111 for the reader station 101 in the outside area of the wall 103, and to install an exposed or surface-mounted station 123 inside the building, as illustrated by way of example in FIG. 14. The surface-mounted station 123 can include a housing 125, which housing 125 can be provided with a housing cover 124. The housing 125 can also have a bottom 126, which bottom 126 can be positively and non-positively connected with the connecting tube 104. In this variant, the use of the connecting tube 104 can create a realization which can be essentially secure against vandalism and which can meet essentially all operating requirements. Essentially any of the desired components can be installed inside the housing 125.

As the preceding description shows, the object of the invention is a system which is easy to install, and which can include stations corresponding with one another, which stations can also be essentially secure against vandalism and sabotage. A commercially-available size can be selected for the flush-mounted boxes 111 and 112, which means that essentially no special tools can be required for the installation. Crown bits or drills can normally be used to essentially guarantee a neat installation.

One feature of the present invention resides broadly in the device for a wireless data inquiry system from a response station, in which the response station is supplied with the necessary energy by a wireless inquiry signal from an inquiry station, and the transmission of energy and data is performed capacitively or inductively, characterized by the fact that an inductance 4 and 8 and a capacitance 12 and 14 respectively are located one on top of the other, and the capacitances 12 and 14 consist of a high-resistance, electrically-conductive, non-metallic substance.

Another feature of the present invention resides broadly in the device characterized by the fact that the conductive substance is a resist.

Yet another feature of the present invention resides broadly in the device characterized by the fact that the conductive substance is a carbon conducting or semiconducting varnish.

Still another feature of the present invention resides broadly in the device characterized by the fact that the electrically conductive substance is a plastic or a plastic film.

A further feature of the present invention resides broadly in the device characterized by the fact that the inductance 4 or 8 is connected on one side 10 of a backing 3, and the capacitance 12 or 14 is deposited on the other side 11 of the backing 3.

Another feature of the present invention resides broadly in the device characterized by the fact that the capacitance 12 or 14 is deposited directly on the inductance 4 or 8 respectively.

Yet another feature of the present invention resides broadly in the device characterized by the fact that the capacitance 12 consists of two closed, or uninterrupted or continuous, capacitor surfaces 1, 2, which are located one inside the other with a dielectric 15.

Still another feature of the present invention resides broadly in the device characterized by the fact that the capacitance 12 consists of two capacitor surfaces 5, 6 located one inside the other, and each of which is provided with an interruption 7 and 13.

A further feature of the present invention resides broadly in the device characterized by the fact that the inductance 4 is a printed circuit.

Another feature of the present invention resides broadly in the device characterized by the fact that the inductance 4 is applied to the backing 3 by vapor deposition.

Yet another feature of the present invention resides broadly in the device characterized by the fact that the inductance 8 consists of a self-supporting coil.

Still another feature of the present invention resides broadly in the method for the manufacture of a device for the wireless retrieval of information from a response station, in which the response station is supplied with the necessary energy by a wireless inquiry signal from an inquiry station, and the transmission of energy and data takes place capacitively or inductively, characterized by the fact that the electrically conducting substances are sprayed on.

A further feature of the present invention resides broadly in the method characterized by the fact that the electrically conductive substance is painted on.

Another feature of the present invention resides broadly in the method characterized by the fact that the electrically conductive substance is applied by a screen printing process.

Some examples of alarm systems which may be utilized in accordance with the embodiments of the present invention may be found in the following U.S. Patents: U.S. Pat. No. 5,374,936 entitled "security System"; U.S. Pat. No. 5,115,224 entitled "Personal Security System Network" to Detection Systems; and U.S. Pat. No. 5,191,314 entitled "Combination Anti-theft Lock and Alarm" to Pacific West Industries.

Some examples of latch connections which may be utilized in accordance with embodiments of the present invention may be found in the following U.S. Patents; U.S. Pat No. 5,317,890 entitled "Mortise Look Latch Assembly"; U. S. Pat. No. 5,368,162 entitled "Safety Device for Parallelepipedic Box" to MW Trading; and U.S. Pat. No. 5,267,780 entitled "Box Latch and Prop Rod" to Deere & Company.

Some examples of bayonet connections which may be utilized in accordance with embodiments of the present invention may be found in the following U.S. patents: U.S. Pat. No. 5,176,414 entitled "Snap-on Bayonet Nut Coupling Sleeve" to Kings Electronics; U.S. Pat. No. 5,256,077 entitled "Electrical Connector Shell Reinforcement Means and Method for Fabricating Same" to Matrix Science Corporation; and U.S. Pat. No. 5,272,900 entitled "Bayonet Style Connector for Metal Extrusion Dummy Block" to Exco.

Some examples of card readers which may be utilized in accordance with embodiments of the present invention may be found in the following U.S. Patents: U.S. Pat. No. 5,257,414 entitled "Apparatus for Accepting and Retaining a Memory Card" to Motorola; U.S. Pat. No. 5,291,006 entitled "Authenticity Identifying System for Information Storage Cards" to NHK Springs; and U.S. Pat. No. 5,373,146 entitled "Card Based Access System with Reader Updating of the Memory".

Some examples of voice identification systems which may be utilized in accordance with the present invention may be found in the following U.S. Patents: U.S. Pat. No. 5,214,699 entitled "System for Decoding and Displaying Personalized Identification Stored on Memory Storage Device" to Audio Digital Imaging; U.S. Pat. No. 5,241,649 entitled "Voice Recognition Method" to Matsushita; and U.S. Pat. No. 5,268,963 entitled "System for Encoding Personalized Identification for Storage on Memory Storage Devices" to Audio Digital Imaging.

Additional examples of personal identification systems which may be utilized in accordance with embodiments of the present invention may be found in the following U.S. Patents: U.S. Pat. No. 5,291,560 entitled "Biometric Personal Identification System Based on Iris Analysis"; U.S. Pat No. 5,187,748 entitled "Optical Apparatus for Fingerprint Identification System" to Goldstar; U.S. Pat. No. 5,210,588 entitled "Fingerprint Identification Apparatus for Enhancing Identification Performance" to Goldstar; and U.S. Pat. No. 5,363,453 entitled "Non-minutiae Automatic Fingerprint Identification System and Methods" to TMS Inc.

Some examples of antennas and transponders which may be utilized in accordance with the embodiments of the present invention may be found in the following U.S. Patents: U.S. Pat. No. 5,347,263 entitled "Electronic Identifier Apparatus and Method Utilizing a Single Chip Microcontroller and an Antenna Coil" to Gnuco; U.S. Pat. No. 5,266,942 entitled "Security System with Memory in Transmitter and Receiver" to Stoller; U.S. Pat. No. 5,371,719 entitled "High Security Ultrasonic Receiver Apparatus" to Sentry; and U.S. Pat. No. 5,185,611 entitled "Compact Antenna Array for Diversity Applications" to Motorola.

Some examples of LEDs and operating indicators which may be utilized in accordance with the present invention may be found in the following U.S. patents: U.S. Pat. No. 5,216,287 entitled "Electronic, Preferably Zero-contact Switch" to Werner Turck; U.S. Pat No. 5,268,635 entitled "Intelligent Self-Diagnosing and Sparing Light Emitting Diodes" to AT&T; and U.S. Pat. No. 5,331,333 entitled "Display Apparatus" to Sharp Kabushiki Kaisha.

Some examples of high-strength plastics and metals which may be utilized in accordance with the embodiments of the present invention may be found in the following U.S. patents: U.S. Pat. No. 5,229,177 entitled "Multi-directional, Light-weight, High-strength Interlaced Material" to Quadrax; U.S. Pat. No. 5,330,594 entitled "Method of Making Cold Formed High-Strength Steel Parts" to Consolidated Metal Products, Inc.; and U.S. Pat. No. 5,179,244 entitled "Reinforced Soft and Hard Body Armor".

Examples of general components relating to transmitters or receivers which may be utilized in accordance with the embodiments of the present invention, may be found in the following U.S. patents and other patent publications U.S. Pat. No. 4,356,477, which issued to Vandebult on Oct. 26, 1982; U.S. Pat. No. 5,321,412, which issued to Kopp at al. on Jun. 14, 1994; Published European Patent Application No. 0 387 970, inventor Fockens (corresponding to U.S. Pat. No. 5,051,727); and Published European Patent Application No. 0 565 481, inventor Kind (corresponding to U.S. Pat. No. 5,349,339).

Other examples of general components relating to transmitters/receivers which may be utilized in accordance with the embodiments of the present invention, may be found in the following U.S. patents: U.S. Pat. No. 4,736,207, which issued to Siikarla et al. on Apr. 5, 1988; U.S. Pat. No. 5,109,217, which issued to Siikarla et al. on Apr. 28, 1992; U.S. Pat. No. 4,642,640, which issued to Woolsey et al. on Feb. 10, 1987; U.S. Pat. No. 4,063,229, which issued to Welsh et al. on Dec. 13, 1977; U.S. Pat. No. 4,139,844, which issued to Reeder on Feb. 13, 1979; U.S. Pat. No. 4,352,098, which issued to Stephen at al. on Sept. 28, 1982; U.S. Pat. No. 4,212,002, which issued to Williamson on Jul. 8, 1980; U.S. Pat. No. 3,895,368, which issued to Gorden et al. on Jul. 15, 1975; U.S. Pat. No. 5,349,332; U.S. Pat. No. 5,300,922, which issued to Stoffer; and U.S. Pat. No. 4,531,117, which issued to Nourse et al.

Some examples of inductive coupling devices which may be used in conjunction with the present invention are to be found in U.S. Pat. No. 5,377,807, issued to Kojima at al. on Jan. 3, 1995 and entitled "Coin Validator with Optical Coupling"; U.S. Pat. No. 5,396,538, issued to Hong on Mar. 7, 1995 and entitled "Contactless Digital Power Transmission and Reception System in a Radio Telephone"; U.S. Pat. No. 5,423,334, issued to Jordan on Jun. 13, 1995 and entitled "Implantable Medical Device Characterization System"; U.S. Pat. No. 5,426,667, issued to van Zon on Jun. 17, 1993 and entitled "System for the Contactless Exchange of Data, and Responder for Use in such a System"; and U.S. Pat. No. 5,437,277, issued to Dumoulin et al. on Aug. 1, 1995 and entitled "Inductively Coupled RF Tracking System for Use in Invasive Imaging of a Living Body".

Some examples of capacitive coupling devices which may be used in conjunction with the present invention are to be found in U.S. Pat. No. 5,380,320, issued to Morris on Jan. 10, 1995 and entitled "Electrosurgical Instrument having a Parylene Coating"; U.S. Pat. No. 5,383,465, issued to Lesny et al. on Jan. 24, 1995 and entitled "Ultrasonic Instrument"; U.S. Pat. No. 5,394,365, issued to Tsukikawa on Mar. 28, 1995 and entitled "Charge Pump Circuit having an Improved Charge Pumping Efficiency"; U.S. Pat. No. 5,420,806, issued to Shou et al. on May. 30, 1995 and entitled "Multiplication Circuit for Multiplying Analog signals by Digital Signals"; U.S. Pat. No. 5,423,206, issued to Hetzel on Jun. 13, 1995 and entitled "Fluid Flow Apparatus with Capacitive Sensors"; U.S. Pat. No. 5,432,457, issued to Mitzner et al. on Jul. 11, 1995 and entitled "Capacitive and Inductive Coupling Connector"; and U.S. Pat. No. 5,466,892, issued to Howard et al. on Nov. 14, 1995 and entitled "Circuit Boards Including Capacitive Coupling for Signal Transmission and Methods of Use and Manufacture", each of these patents being hereby expressly incorporated by reference herein.

An example of an apparatus employing both inductive coupling and capacitive coupling which may be employed in conjunction with the present invention is U.S. Pat. No. 5,432,486, issued to Wong on Jul. 11, 1993 and entitled "Capacitive and Inductive Coupling Connector".

Some examples of smart cards and key cards which may be used in conjunction with the present invention are to be found in U.S. Pat. No. 5,198,643, issued to Miron at al. on Mar. 30, 1993 and entitled "Adaptable Electronic Key and Lock System"; U.S. Pat. No. 5,204,663, issued to Lee on Apr. 20, 1993 and entitled "Smart Card Access Control System"; U.S. Pat. No. 5,241,161 issued to Zuta on Sept. 31, 1993 and entitled "Smart Card Integrated in a Wristwatch and Having Logic Unit Controlling the Automatic Identification Process and the Data Transfer"; U.S. Pat. No. 5,255,430, issued to Tallaksen on Oct. 26, 1993 and entitled "Method of Assembling a Module for a Smart Card"; U.S. Pat. No. 5,311,396, issued to Steffen on May. 10, 1994 and entitled "Smart Card Chip-Based Electronic Circuit"; U.S. Pat. No. 5,331,138, issued to Saroya on Jul. 19, 1994 and entitled "Hybrid Card Reader"; U.S. Pat. No. 5,341,140, issued to Perry on Aug. 23, 1994 and entitled "Transponder System"; U.S. Pat. No. 5,341,428, issued to Schatz on Aug. 23, 1994 and entitled "Multiple Cross-Check Document Verification System"; U.S. Pat. No. 5,422,634, issued to Okubo on Jun. 6, 1995 and entitled "Looking System Using a Key Including an IC Memory"; U.S. Pat. No. 5,477,041, issued to Miron et al. on Dec. 19, 1995 and entitled "Adaptable Electronic Key and Lock System"; U.S. Pat. No. 5,380,991, issued to Valencia et al. on Jan. 10, 1995 and entitled "Paperless Coupon Redemption System and Method Thereof"; U.S. Pat. No. 5,404,580, issued to Simpson et al. on Apr. 4, 1995 and entitled "Radio Having Memory Means for Storing Radio User Validation Code"; U.S. Pat. No. 5,412,564, issued to Ecer on May. 2, 1995 and entitled "System and Method for Diet Control"; U.S. Pat. No. 5,426,701, issued to Herrmann et al. on Jun. 20, 1995 and entitled "Cable Television Converter Box with a Smart Card Connector Underneath"; U.S. Pat. No. 5,436,971, issued to Armbrust et al. on Jul. 25, 1995 and entitled "Method of and Circuit Arrangement for Checking a Smart Card"; U.S. Pat. No. 5,446,266, issued to Beuk et al. on Aug. 29, 1995 and entitled "Security System for an Apparatus"; U.S. Pat. No. 5,461,217, issued to Claus on Oct. 24, 1995 and entitled "Secure Money Transfer Techniques Using Smart Cards"; U.S. Pat. No. 5,470,260, issued to Schwan et al. on Nov. 28, 1995 and entitled "Smart Card Connector"; and U.S. Pat. No. 5,471,045, issued to Geronimi on Nov. 28, 1995 and entitled "Smart Card Locking Process".

Some examples of inductive coupling devices which may be used in conjunction with the present invention may be found in German Patent Application No. 44 11 290.4 issued and Mar. 31, 1994 and International Patent Application No. PCT/DE95/00038 issued on Jan. 14, 1995.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign and international patent publication applications, namely, Federal Republic of Germany Patent Application No. 44 32 324.7, filed on Sept. 13, 1994, having inventor Gerhard Kirchhoff, and DE-OS44 32 324.7 and DE-PS 44 32 324.7 and International Application No. PCT/DE95/01127, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

| Partial Nomenclature |
| --- |
| 1 Capacitor surface |
| 2 Capacitor surface |
| 3 Backing |
| 4 Inductance |
| 5 Capacitor surface |
| 6 Capacitor surface |
| 7 Interruption |
| 8 Inductance |
| 9 Circuit |
| 10 Side |
| 11 Side |
| 12 Capacitance |
| 13 Interruption |
| 14 Capacitance |
| 15 Dielectric |

What is claimed is:

1. A security arrangement for preventing unauthorized access, said security arrangement comprising:
   at least one device to be at least read;
   device reader means to read said at least one device;
   said at least one device comprising:
      a first electronic circuit for processing and storing data; and
      device antenna means;
   said device antenna means being disposed on said at least one device;
   said device reader means comprising:
      power supply means for supplying power to said at least one device, said power supply means comprising means for generating and transmitting magnetic energy in a predetermined magnetic frequency range;
      a second electronic circuit for processing and storing data; and
      device reader antenna means;
   said device reader antenna means being disposed on said device reader means;
   at least one of said device reader antenna means and said device antenna means comprising means for transmitting data between said device reader antenna means and said device antenna means;
   at least one of said device reader antenna means and said device antenna means comprising means for transmitting power between said device reader antenna means and said device antenna means;
   at least one of said device reader antenna means and said device antenna means comprising both:
      a magnetic inductive element; and
      a capacitive element;
   said magnetic inductive element and said capacitive element being disposed one on top of the other;
   said capacitive element having a substantially higher impedance in a predetermined magnetic frequency range than said magnetic inductive element to thereby substantially reduce loading of said magnetic energy by said capacitive element;
   said means for transmitting data between said device reader antenna means and said device antenna means comprising one of said magnetic inductive element and said capacitive element;
   said means for transmitting power between said device reader antenna means and said device antenna means comprising the other of said one of said magnetic inductive element and said capacitive element;
   said capacitive element comprising a high-resistance, electrically-conductive substance; and
   said high-resistance, electrically-conductive substance comprising at least one of: a resist, a carbon conducting varnish, a carbon semiconducting varnish, a plastic and a plastic film.

2. A security device according to claim 1, wherein:
   said magnetic inductive element is a first magnetic inductive element;
   said capacitive element is a first capacitive element;
   said device reader antenna means comprises both said first magnetic inductive element and said first capacitive element;
   said device antenna means comprises both a second magnetic inductive element and a second capacitive element;
   said means for transmitting data between said device reader antenna means and said device antenna means comprises said first capacitive element and said second capacitive element;
   said means for transmitting power between said device reader antenna means and said device antenna means comprises said first magnetic inductive element and said second magnetic inductive element; and
   at least one of said device reader antenna means and said device antenna means additionally comprises a backing member, said backing member having a first side and a second side opposite to said first side, wherein said magnetic inductive element corresponding to said at least one of said device reader antenna means and said device antenna means is disposed on said first side of said backing member, and wherein said capacitive element corresponding to said at least one of said device reader antenna means and said device antenna means is disposed on said second side of said backing member.

3. A security device according to claim 2, wherein said first capacitive element and said second capacitive element each comprises a first continuous and uninterrupted capacitive surface and a second continuous and uninterrupted capacitive surface, said second capacitive surface of each of said first capacitive element and said second capacitive element encircling said corresponding first capacitive surface of said first capacitive element and said second capacitive element.

4. A security device according to claim 3, wherein said first magnetic inductive element and said second magnetic inductive element each comprises at least one of: a printed circuit member and a self-supporting coil structure.

5. A security device according to claim 3, wherein:
said backing member is a first backing member;
said device reader antenna means comprises said first backing member;
said device reader means comprises a second backing member;
said first magnetic inductive element is applied to said first backing member by a vapor deposition process; and
said second magnetic inductive element is applied to said second backing member by a vapor deposition process.

6. A security device according to claim 2, wherein said first capacitive element and said second capacitive element each comprises a first semiannular capacitive surface and a second semiannular capacitive surface, said second semiannular capacitive surface of each of said first capacitive element and said second capacitive element at least partially encircling said corresponding first semiannular capacitive surface of said first capacitive element and said second capacitive element.

7. A security device according to claim 1, wherein:
said magnetic inductive element is a first magnetic inductive element;
said capacitive element is a first capacitive element;
said device reader antenna means comprises both said first magnetic inductive element and said first capacitive element;
said device antenna means comprises both a second magnetic inductive element and a second capacitive element; and
said first capacitive element is in direct contact with said first magnetic inductive element and said second capacitive element is in direct contact with said second magnetic inductive element.

8. A security device according to claim 7, wherein said first capacitive element is applied directly to said first magnetic inductive element by a deposition process and said second capacitive element is applied directly to said second magnetic inductive element by a deposition process.

9. A smart card reader for a security device for preventing unauthorized access, the security device including said smart card reader and at least one smart card, the at least one smart card including a first electronic circuit for processing and storing data and a smart card antenna, said smart card reader comprising:
power supply means for supplying power to the at least one smart card, said power supply means comprising means for generating and transmitting magnetic energy in a predetermined frequency range;
a second electronic circuit for processing and storing data;
a smart card reader antenna, said smart card reader antenna comprising:
a magnetic inductive element; and
a capacitive element;
one of said magnetic inductive element and said capacitive element comprising means for transmitting data between said smart card reader antenna and the smart card antenna;
the other of said one of said magnetic inductive element and said capacitive element comprising means for transmitting power between said smart card reader antenna and the smart card antenna;
said magnetic inductive element and said capacitive element being disposed adjacent to one another; and
said capacitive element having a substantially higher impedence than said magnetic inductive element to thereby substantially reduce loading of said magnetic energy by said capacitive element.

10. A smart card reader according to claim 9 wherein:
said magnetic inductive element and said capacitive element are disposed one on top of the other;
said capacitive element comprises a high-resistance, electrically-conductive substance;
said smart card reader antenna additionally comprises a backing member, said backing member having a first side and a second side opposite to said first side, wherein said magnetic inductive element is disposed on said first side of said backing member, and wherein said capacitive element is disposed on said second side of said backing member;
said capacitive element comprises a first capacitive surface and a second capacitive surface, said second capacitive surface being at least partially annular in configuration, and said second capacitive surface at least partially encircling said first capacitive surface; and
said magnetic inductive element comprises at least one of: a printed circuit member and a self-supporting coil structure.

11. A smart card reader according to claim 10, wherein:
said high-resistance, electrically-conductive substance comprises at least one of: a resist, a carbon conducting varnish, a carbon semiconducting varnish, a plastic and a plastic film;
said capacitive element comprises said means for transmitting data between said smart card reader antenna and the smart card antenna;
said magnetic inductive element comprises said means for transmitting power between said smart card reader antenna and the smart card antenna; and
said magnetic inductive element is applied to said backing member by a vapor deposition process.

12. A smart card reader according to claim 9, wherein:
said capacitive element comprises a high-resistance, electrically-conductive substance, said high-resistance, electrically-conductive substance comprising at least one of: a resist, a carbon conducting varnish, a carbon semiconducting varnish, a plastic and a plastic film;
said capacitive element comprises a first capacitive surface and a second capacitive surface, said second capacitive surface being at least partially annular in configuration, and said second capacitive surface at least partially encircling said first capacitive surface;
said capacitive element comprises said means for transmitting data between said smart card reader antenna and the smart card antenna;

said magnetic inductive element comprises said means for transmitting power between said smart card reader antenna and the smart card antenna;

said magnetic inductive element and said capacitive element are disposed one on top of the other;

said capacitive element is in direct contact with said magnetic inductive element; and said magnetic inductive element comprises at least one of: a printed circuit member and a self-supporting coil structure.

13. A smart card for use with a security device for preventing unauthorized access, the security device including a smart card reader and said smart card, the smart card reader including a power supply for supplying power to said smart card, the power supply including apparatus for generating and transmitting magnetic energy in a predetermined frequency range, an electronic circuit for processing and storing data and a smart card reader antenna, said smart card comprising:

another electronic circuit for processing and storing data;

a smart card antenna;

said smart card antenna comprising:
a magnetic inductive element; and
a capacitive element;

said capacitive element comprising means for transmitting data between said smart card antenna and the smart card reader antenna;

said magnetic inductive element comprising means for transmitting power between said smart card antenna and the smart card reader antenna;

said magnetic inductive element and said capacitive element being disposed adjacent to one another; and said capacitive element having a substantially higher impedence than said magnetic inductive element to thereby reduce loading of said magnetic energy by said capacitive element.

14. A smart card according to claim 13, wherein:

said magnetic inductive element and said capacitive element are disposed one on top of the other; and said capacitive element comprises a high-resistance, electrically-conductive, non-metallic substance.

15. A smart card according to claim 14, wherein:

said high-resistance, electrically-conductive, non-metallic substance comprises at least one of: a resist, a carbon conducting varnish, a carbon semiconducting varnish, a plastic and a plastic film;

said smart card antenna additionally comprises a backing member, said backing member having a first side and a second side opposite to said first side, wherein said magnetic inductive element is disposed on said first side of said backing member, and wherein said capacitive element is disposed on said second side of said backing member;

said capacitive element comprises a first capacitive surface and a second capacitive surface, said second capacitive surface being at least partially annular in configuration, and said second capacitive surface at least partially encircling said first capacitive surface;

said magnetic inductive element comprises at least one of: a printed circuit member and a self-supporting coil structure; and said magnetic inductive element is applied to said backing member by a vapor deposition process.

16. A smart card according to claim 13, wherein:

said magnetic inductive element and said capacitive element are disposed one on top of the other;

said capacitive element comprises a high-resistance, electrically-conductive substance, said high-resistance, electrically-conductive substance comprising at least one of: a resist, a carbon conducting varnish, a carbon semiconducting varnish, a plastic and a plastic film;

said capacitive element comprises a first capacitive surface and a second capacitive surface, said second capacitive surface being at least partially annular in configuration, and said second capacitive surface at least partially encircling said first capacitive surface;

said capacitive element is in substantially direct contact with said magnetic inductive element; and said magnetic inductive element comprises at least one of: a printed circuit member and a self-supporting coil structure.

17. A method for the manufacture of a security device for preventing unauthorized access, said security device comprising:

smart card reader means;

at least one smart card;

said at least one smart card comprising:
a first electronic circuit for processing and storing data; and
smart card antenna means;

said smart card antenna means being disposed on said at least one smart card;

said smart card reader means comprising:
power supply means for supplying power to said at least one smart card, said power supply means comprising means for generating and transmitting magnetic energy in a predetermined frequency range;
a second electronic circuit for processing and storing data; and
smart card reader antenna means;

said smart card reader antenna means being disposed on said smart card reader means;

said smart card reader antenna means comprising first transducer means and second transducer means;

said smart card antenna means comprising third transducer means and fourth transducer means;

said first transducer means of said smart card reader antenna means being for coupling with said third transducer means of said smart card antenna means by one of a magnetic field and an electromagnetic field;

said coupling of said first transducer means of said smart card reader antenna means with said third transducer means of said smart card antenna means comprising means for transmitting data between said smart card reader means and said smart card;

said second transducer means of said smart card reader antenna means being for coupling with said fourth transducer means of said smart card antenna means by one of a magnetic field and an electromagnetic field;

said coupling of said second transducer means of said smart card reader antenna means with said fourth transducer means of said smart card antenna means comprising means for transmitting power from said smart card reader means to said smart card;

at least one of said first and third transducer means having an impedence that is substantially higher than the impedence of at least one of said second and fourth transducer means in the operating range of said second and fourth transducer means;

each of said first and third transducers comprising a capacitive element comprising a high-resistance, electrically-conductive, non-metallic substance;

each of said second and fourth transducers comprising a magnetic inductive element;

said method for the manufacture of said security device comprising the steps of:

constructing said smart card according to the steps of:

disposing said capacitive element of said first transducer means on said smart card to be adjacent to said capacitive element of said third transducer means on said smart card reader means during use of said security device to permit data to be transferred capacitively between said smart card and said smart card reader means;

disposing said magnetic inductive element of said second transducer means on said smart card to be adjacent to said magnetic inductive element of said fourth transducer means on said smart card reader means during use of said security device to permit power to be transferred inductively between said smart card and said smart card reader means;

fabricating said smart card antenna means by attaching said first transducer means and said second transducer means together;

said step of attaching said first transducer means and said second transducer means together comprising the step of disposing said first transducer means and said second transducer means one on top of the other; and operatively connecting said smart card antenna means to said first electronic circuit; and constructing said smart card reader means according to the steps of:

fabricating said smart card reader antenna means by attaching said third transducer means and said fourth transducer means together;

said step of attaching said third transducer means and said fourth transducer means together comprising the step of disposing said third transducer means and said fourth transducer means one on top of the other; and operatively connecting said smart card reader antenna means to said power supply means and said second electronic circuit.

18. The method for the manufacture of a security device according to claim 17, wherein:

said step of disposing said first transducer means and said second transducer means one on top of the other and said step of disposing said third transducer means and said fourth transducer means one on top of the other comprises one of the steps of:

disposing said capacitive element on one side of a backing member and disposing said magnetic inductive element on the other side of the backing member; and disposing said capacitive element directly onto said magnetic inductive element; and said third transducer means has an impedance that is substantially higher than the impedance of said fourth transducer means in the operating range of said fourth transducer means.

19. The method for the manufacture of a security device according to claim 18 wherein said step of disposing said first transducer means and said second transducer means one on top of the other and said step of disposing said third transducer means and said fourth transducer means one on top of the other comprises at least one of the steps of:

applying said capacitive element by a spraying process;

applying said capacitive element by a painting process; and applying said capacitive element by a screen printing process.

* * * * *

UNITED STATES PATENT AND TRADEMARK OFFICE
CERTIFICATE OF CORRECTION

PATENT NO.   : 5,841,122
DATED        : November 24, 1998
INVENTOR(S)  : Gerhard KIRCHHOFF It is certified that error appears in the above-identified patent and that said Letters Patent is hereby corrected as shown below:

In column 12, line 58, before 'Mar.', delete "and" and insert --on--.

Signed and Sealed this

Twenty-seventh Day of July, 1999

Attest:

Q. TODD DICKINSON

Attesting Officer

Acting Commissioner of Patents and Trademarks